(12) United States Patent
Shafiee et al.

(10) Patent No.: US 8,781,922 B2
(45) Date of Patent: Jul. 15, 2014

(54) PROCESSING A BILL OF MATERIALS

(75) Inventors: Mohammad Reza Shafiee, Ridgefield, CT (US); Satya S. Raju, Flower Mound, TX (US); Rajesh Chaganti, Flower Mound, TX (US); Ashutosh K. Sureka, Irving, TX (US); Shuchi Patel, Frisco, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 642 days.

(21) Appl. No.: 12/971,011

(22) Filed: Dec. 17, 2010

(65) Prior Publication Data
US 2012/0158554 A1 Jun. 21, 2012

(51) Int. Cl.
*A01K 5/02* (2006.01)
*G06F 17/50* (2006.01)

(52) U.S. Cl.
USPC .......................................................... 705/29

(58) Field of Classification Search
USPC .......................................................... 705/29
See application file for complete search history.

(56) References Cited

U.S. PATENT DOCUMENTS

| 4,459,663 | A  | * | 7/1984  | Dye ................................. 705/29    |
| 5,367,624 | A  | * | 11/1994 | Cooper .......................... 715/734     |
| 6,330,005 | B1 | * | 12/2001 | Tonelli et al. .................. 715/735     |
| 6,347,256 | B1 | * | 2/2002  | Smirnov et al. ............... 700/100        |
| 2002/0111877 | A1 | * | 8/2002  | Nelson ............................ 705/26  |
| 2002/0156797 | A1 | * | 10/2002 | Lee et al. ....................... 707/200 |
| 2003/0149608 | A1 | * | 8/2003  | Kall et al. .......................... 705/8 |
| 2004/0181371 | A1 | * | 9/2004  | Huang et al. .................. 702/188    |
| 2004/0181506 | A1 | * | 9/2004  | Hsiang .............................. 707/1 |
| 2005/0043979 | A1 | * | 2/2005  | Soares et al. ....................... 705/7 |
| 2005/0251520 | A1 | * | 11/2005 | Vidov et al. .................... 707/100  |
| 2006/0282345 | A1 | * | 12/2006 | Nelson ............................. 705/28 |
| 2009/0063309 | A1 | * | 3/2009  | Stephens ......................... 705/29    |
| 2010/0114641 | A1 | * | 5/2010  | Coffman et al. ................... 705/9    |
| 2011/0126111 | A1 | * | 5/2011  | Gill et al. ....................... 715/736 |
| 2011/0172799 | A1 | * | 7/2011  | Erickson et al. .............. 700/100     |

* cited by examiner

Primary Examiner — Seye Iwarere

(57) ABSTRACT

A system may receive an input specification, compose a workflow by connecting an output port of a first one of a plurality of work units to an input port of a second one of the work units, receive a work order associated with the workflow, decompose the workflow into constituent work units upon receipt of the work order, instantiate tasks that correspond to the work units, generate a bill of materials that lists input and output files associated with the tasks based on the tasks and the input specification, and update fields of the bill of materials, the fields indicating states of the input and output files.

20 Claims, 14 Drawing Sheets

|  | TASK | TASK ID 732 | ASSET CLASS 734 | FILE NAME 736 | SRC. TYPE 738 | DIR. 740 | ASSET ID 742 | STATE 744 | CORR. ID 746 | JOB ID 748 | FILE SIZE 750 |
|---|---|---|---|---|---|---|---|---|---|---|---|
| 702 | INGEST | 1 | MOVIE | T1 | ORDER | OUT |  | PROG | C2345 | J34 |  |
|  |  | 1 | MOVIE | T2 | ORDER | OUT |  | READY |  |  |  |
|  |  | 1 | PREV | T5 | ORDER | OUT |  | READY |  |  |  |
|  |  | 1 | PREV | T6 | ORDER | OUT |  | READY |  |  |  |
|  |  | 1 | BUG | T7 | ORDER | OUT |  | READY |  |  |  |
|  |  | 1 | BUG | T8 | ORDER | OUT |  | READY |  |  |  |
| 704 | X-FORM | 2 | MOVIE | T1 | ORDER | IN |  | PEND |  |  |  |
|  |  | 2 | MOVIE | T9 | TEMP | OUT |  | PEND |  |  |  |

← DECOMPOSITION INFORMATION | EXECUTION INFORMATION →

FIG. 8A

|  | TASK | TASK ID 732 | ASSET CLASS 734 | FILE NAME 736 | SRC. TYPE 738 | DIR. 740 | ASSET ID 742 | STATE 744 | CORR. ID 746 | JOB ID 748 | FILE SIZE 750 |
|---|---|---|---|---|---|---|---|---|---|---|---|
| 702 | INGEST | 1 | MOVIE | FILE1 | AM | OUT | 1234 | COMP | C2345 | J34 | 4 G |
|  |  | 1 | MOVIE | T2 | ORDER | OUT |  | READY |  |  |  |
|  |  | 1 | PREV | T5 | ORDER | OUT |  | READY |  |  |  |
|  |  | 1 | PREV | T6 | ORDER | OUT |  | READY |  |  |  |
|  |  | 1 | BUG | T7 | ORDER | OUT |  | READY |  |  |  |
|  |  | 1 | BUG | T8 | ORDER | OUT |  | READY |  |  |  |
| 704 | X-FORM | 2 | MOVIE | FILE1 | AM | IN | 1234 | READY | C2346 | J35 | 4 G |
|  |  | 2 | MOVIE | T9 | TEMP | OUT |  | PEND |  |  |  |

← DECOMPOSITION INFORMATION | EXECUTION INFORMATION →

FIG. 8B

| TASK | | DECOMPOSITION INFORMATION | | | | EXECUTION INFORMATION | | | | |
|---|---|---|---|---|---|---|---|---|---|---|
| | TASK ID 732 | ASSET CLASS 734 | FILE NAME 736 | SRC. TYPE 738 | DIR. 740 | ASSET ID 742 | STATE 744 | CORR. ID 746 | JOB ID 748 | FILE SIZE 750 |
| 702 INGEST | 1 | MOVIE | FILE1 | AM | OUT | 1234 | COMP | C2345 | J34 | 4 GB |
| | 1 | MOVIE | T2 | ORDER | OUT | | READY | | | |
| | 1 | PREV | T5 | ORDER | OUT | | READY | | | |
| | 1 | PREV | T6 | ORDER | OUT | | READY | | | |
| | 1 | BUG | T7 | ORDER | OUT | | READY | | | |
| | 1 | BUG | T8 | ORDER | OUT | | READY | | | |
| 704 X-FORM | 2 | MOVIE | FILE1 | AM | IN | 1234 | COMP | C2346 | J35 | 4 G |
| | 2 | MOVIE | FILE2 | AM | OUT | 1235 | COMP | C2346 | J35 | 3.5 G |
| 706 X-FORM | 3 | MOVIE | T2 | ORDER | IN | | PEND | | | |
| | 3 | MOVIE | T10 | TEMP | OUT | | PEND | | | |
| 708 X-FORM | 4 | PREV | T5 | ORDER | IN | | PEND | | | |
| | 4 | PREV | T11 | TEMP | OUT | | PEND | | | |
| 710 X-FORM | 5 | PREV | T6 | ORDER | IN | | PEND | | | |
| | 5 | PREV | T12 | TEMP | OUT | | PEND | | | |
| 712 LAYER BUG | 6 | MOVIE | FILE2 | AM | IN | 1235 | READY | C2347 | J36 | 3.5 G |
| | 6 | BUG | T7 | ORDER | IN | | PEND | | | |
| | 6 | MOVIE | T13 | TEMP | OUT | | PEND | | | |

FIG. 8D

| BILL OF MATERIAL 920 ||
|---|---|
| ID 922 | STATE 936 |
| TASK ID 924 | CORRELATION ID 938 |
| FILE NAME 926 | JOB ID 940 |
| DIRECTION 928 | FILE SIZE 942 |
| ASSET CLASS ID 930 | LOCATION 944 |
| SOURCE TYPE 932 | CREATED DATE 946 |
| ASSET ID 934 | UPDATED DATE 948 |

FIG. 9B

| WORK UNIT TYPES 1100 ||
|---|---|
| CREATE METADATA 1102 | SPLIT MEDIA 1126 |
| TRANSFORM METADATA 1104 | DISTRIBUTE 1128 |
| PULL METADATA 1106 | PACKAGE 1130 |
| PULL MEDIA 1108 | ENCRYPT 1132 |
| CONFIRM DELIVERY 1110 | DECRYPT 1134 |
| ENCODE 1112 | ARCHIVE 1136 |
| DECODE 1114 | SAVE 1138 |
| AD MARKER 1116 | RETRIEVE 1140 |
| CLOSE CAPTIONING 1118 | QUALITY ASSURANCE 1142 |
| BRANCH 1120 | MANUAL INTERVENTION 1144 |
| MERGE 1122 | REPORT 1146 |
| TRANSCODE 1124 | ASSEMBLY 1148 |

FIG. 11

PROCESSING A BILL OF MATERIALS

BACKGROUND

Consumer demand for media is increasing. For example, consumers often watch and/or listen to various media at home, while traveling, at work, etc. As a result, the number of communication channels for delivering media content and the number of different types of devices for playing the content has also increased.

BRIEF DESCRIPTION OF THE DRAWINGS

FIGS. 8A through 8D illustrate updating the bill of materials of FIG. 7 by work unit processes that are associated with the bill of materials;

FIG. 9B is a list of exemplary components of a bill of materials;

FIG. 11 is a list of different types of exemplary work units.

DETAILED DESCRIPTION

Figure 1:
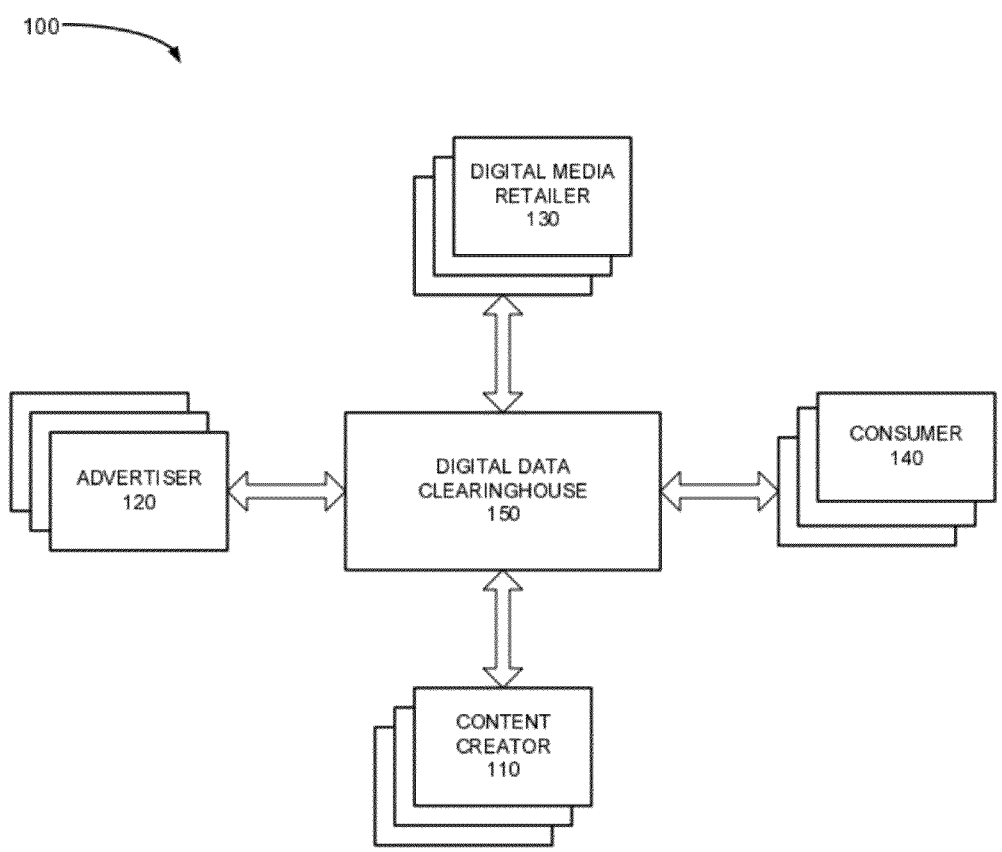
FIG. 1 schematically illustrates an exemplary system in which a digital distribution clearinghouse (DDC) may be implemented.

The following detailed description refers to the accompanying drawings. The same reference numbers in different drawings may identify the same or similar elements. As used herein, the term "content," also referred to as assets, may refer to multimedia content (e.g., text-based content, audio, and video such as a movie, show, television program, broadcast of a live event (e.g., sporting event, concert, etc.)). As used herein, the term "work unit" may refer to a description of a set of one or more operations that a system may perform on content (e.g., overlaying subtitles on a video, inserting advertisements into a video, etc.).

As described herein, a digital data clearinghouse (DDC) may allow a user to define or create work units and use the work units to compose a workflow and, to dynamically provide for customer-requested processes for content distribution. When the user submits a service order for processing content on behalf of a customer, the DDC may obtain, from the workflow associated with the service order, tasks that correspond to the work units. Furthermore, the DDC may perform all or some of these tasks.

In obtaining and performing these tasks, the DDC may also generate what is herein referred to as a "bill of materials." Once generated, the bill of materials may describe inputs and outputs of each task obtained from the workflow. The DDC continually updates the bill of materials as the DDC executes the tasks, until their termination. The DDC may use the bill of materials to reschedule tasks, verify the completion of the tasks, take appropriate actions when one or more of the tasks fail, send the bill of materials to a billing department for invoicing the customer for processing the content in accordance with the workflow, etc.

For example, assume that a user (e.g., a DDC operator or administrator) defines two work units via the DDC. Also assume that the first work unit describes reformatting a M×N video into a 600×400 video, and the second work unit describes inserting an advertisement in the video. When a customer (e.g., a content creator/provider) places an order with the user, requesting that a video provided by the content creator/provider be formatted as a 600×400 video and an advertisement be inserted in the video, the user may compose, through a GUI provided via the DDC, a workflow, by concatenating two or more work units. When the user submits a work order, the DDC may decompose the workflow into, for execution, two tasks that are associated with the work units included in the workflow.

In addition, the DDC outputs a bill of materials (e.g., a table) that shows inputs and outputs for each of the two tasks. The first of the two tasks corresponds to the work unit for transforming the M×N video into a 600×400 video. The bill of materials would indicate that the first task receives one input and generates one output. The second of the two tasks corresponds to the work unit for inserting the advertisement into the transformed video. The bill of materials would indicate that the second task receives two inputs (e.g., a movie and an advertisement) and generates one output (e.g, the movie with the advertisement inserted therein).

As the DDC executes each of the tasks, the DDC may continually update the bill of materials. When the DDC successfully completes each of the tasks, the DDC may forward the bill of materials to the billing department, e.g., for invoicing the customer associated with the tasks. If any of the tasks could not be completed, the bill of materials would show the failed task. In such a case, based on the bill of materials, the DDC may launch a corrective action (e.g., retry to perform the task). Depending on the task, the corrective action may be automatic, or may require a user intervention (e.g., fix a hardware malfunction).

The preceding example is provided for simplicity. Descriptions below provide additional details with respect to work units, workflows, work order, and bill of materials in the context of the DDC. FIG. 1 is a block diagram of an exemplary system 100 in which the DDC may be implemented. Referring to FIG. 1, system 100 includes one or more content creators/providers 110, one or more advertisers 120, one or more digital media retailers (DMRs) 130, one or more consumers 140 and digital data clearinghouse (DDC) 150. The exemplary configuration illustrated in FIG. 1 is provided for simplicity. It should be understood that a typical system may include more or fewer components than illustrated in FIG. 1.

Content creator 110 (referred to collectively as content creators 110 or individually as content creator 110) may represent one or more creators of content that wish to package and/or distribute the content to other parties, such as consumers 140. For example, content creators 110 may include movie or television studios, music companies, publishers, game developers, parties who generate user generated content (UGC), websites, blogsites, etc. Content creators 110 may provide content to DDC 150 for transcoding, packaging and/or distribution, as described in detail below.

Advertiser 120 (referred to collectively as advertisers 120 or individually as advertiser 120) may represent one or more parties that wish to insert advertising into media files. For example, advertiser 120 may contract with a content creator 110 and/or digital media retailer 130 to insert an advertisement into a media stream provided to consumers 140. DDC 150 may insert the advertisement into the stream in accordance with the agreement between the parties.

DMR 130 may represent one or more business entities that receive media content from various parties and resell it to end users. For example, DMRs 130 may include broadcasters, cable companies, direct broadcast satellite (DBS) providers, Internet protocol television (IPTV) providers, mobile phone TV providers, online retailers, etc. DMRs 130 may receive media content from DDC 150 and sell/provide the content to consumers 140.

Consumer 140 may represent one or more consumers 140 that receive content originally generated by or provided by content creators 110 and that has been processed by DDC 150. For example, DDC 150 may format and package content for distribution by DMRs 130 and/or DDC 150 to consumers 140.

DDC 150 may include a server/computing device or a set of servers/computing devices associated with, for example, processing media content. For example, as described briefly above, DDC 150, also referred to herein as DDC platform 150, may provide an automated environment in which content from content creators 110 is transformed and packaged for distribution in any number of formats, based on the particular requirements associated with DMRs 130. In an exemplary implementation, DDC 150 may also aggregate various data and insert advertisements into the media content. DDC 150, consistent with implementations described herein, may also utilize flexible workflows to streamline the formatting and packaging of content for digital distribution.

As described above, the exemplary configuration illustrated in FIG. 1 is provided for simplicity. For example, it should be understood that consumers 140 in system 100 may include advertisers 120 or content creators 110; system 100 may include additional DDCs; etc. In addition, system 100 may include a large number (e.g., thousands) of different types of user devices associated with consumers 140, such as televisions, cellular telephones, personal computers (PCs) laptop computers, tablet computers, notebook computers, netbook computers, personal digital assistants (PDAs), etc. Consequently, in an actual implementation, system 100 may include additional components than those illustrated in FIG. 1, with different content paths.

Figure 2:
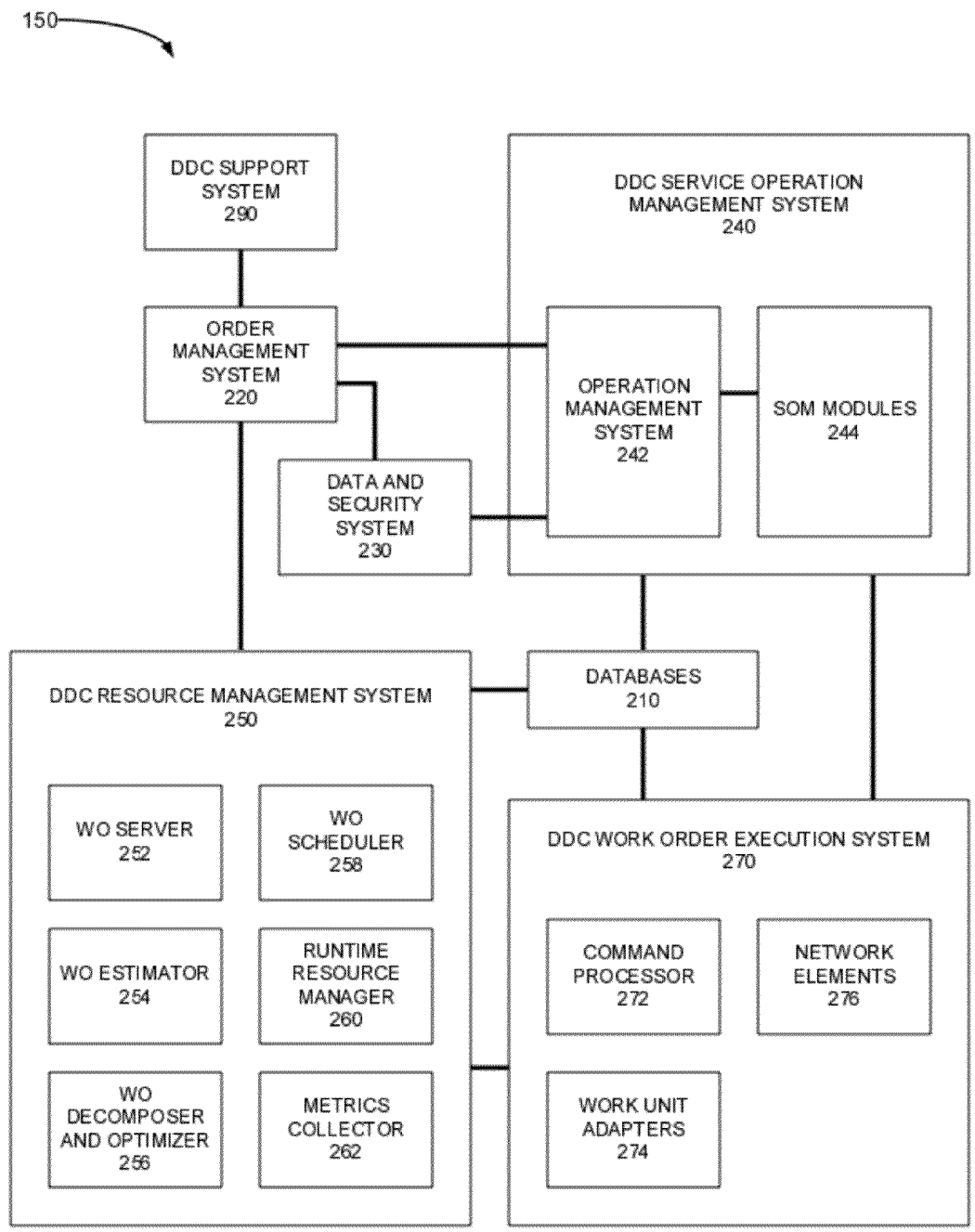
FIG. 2 illustrates an exemplary configuration of the DDC of FIG. 1.

FIG. 2 illustrates an exemplary configuration of DDC 150. Referring to FIG. 2, DDC 150 may include databases 210, order management system 220, data and security system 230, DDC service operation management system 240, DDC resource management system 250, DDC work order execution (WOE) system 270 and DDC support system 290.

Databases 210 may store work unit definitions, workflows, parameters, tables that are associated with various components in DDC 150, intermediate or end results of processing performed by different processes in DDC 150, etc. In addition, databases 210 may receive and store a bill of materials, for a given work order, from DDC resource management system 250.

Order management system 220 may include devices for managing customer orders, generating reports, etc. In an exemplary implementation, order management system 220 may include client components that interface with components on DDC service operation management system 240. The client components (e.g., web browser) may receive customer orders, requests for reports, etc., and relay the received information to the components on DDC service operation management system 240 for the creation, validation, estimation, submission, approval, execution and reporting of activities associated with the customer orders, request for reports, etc. For example, a customer order may be completed by sending, to a component on DDC service operation management system 240, a selection of a particular workflow that will drive the processing of content associated with the order.

Data and security system 230 may include one or more devices to provide for authentication and authorization of users having roles in DDC 150 and/or for taking actions that are associated with the authorized roles (e.g., create user accounts, remove user accounts, generate an initial password, etc.). For example, when a user logs in as a DDC operator, the user may be authorized to design work units and/or compose workflows.

DDC service operation management (SOM) system 240 may include one or more devices to control an overall operation, configuration, and management of DDC 150. For example, DDC SOM system 240 may include operation management system 242 and SOM modules 244. Via a client component that communicates with operation management system 242, a user may control the configuration, administration and operation of DDC 150. For example, in one implementation, via a web browser or another client application, a user may control security, compose a workflow, administer accounts that are associated with content creator 110 or DMR 130, submit a work order, add data and storage to DDC 150, manage resources, manage DDC configuration (e.g., create a work unit), manage catalogs of content, run reports, monitor DDC work orders (e.g., information associated with a work order), etc.

In providing each of such services to a client, operation management system 242 may employ SOM modules 244. SOM modules 244 may include components/modules that correspond to the above-listed services. For example, the modules may include a security manager, workflow manager, account manager, work order manager, data and storage manager, resource management module, configuration manager, asset management module, catalog management module, monitoring and reporting module, etc. As further described below, via the configuration/workflow manager, a user may create a workflow using work units, select a workflow, associate work units of the workflow with presets, and submit the workflow for execution.

DDC resource management system 250 may include one or more devices that support the capacity management of resources associated with network elements (NEs) in DDC 150. As illustrated in FIG. 2, DDC resource management system 250 may include work order (WO) server 252, WO estimator 254, WO decomposer and optimizer 256, WO scheduler 258, runtime resource manager 260, and metrics collector 262.

Depending on the embodiment, DDC resource management system 250 may implement additional, fewer, or different components than those illustrated in FIG. 2. For example, in one embodiment, DDC resource management system 250 may include a jeopardy manager to generate alarms when a rate of task processing falls below an acceptable threshold or will impact the target completion date/time. In another embodiment, DDC resource management system 250 may include a component for providing reports on resources, schedules, metrics, etc.

WO server 252 may provide work order-related interfaces to operation management system 242 and/or SOM modules 244, and may communicate with WO estimator 254, WO decomposer and optimizer 256, and WO scheduler 258 to submit, decompose, validate, and save work orders, and to estimate, schedule, and reserve resources during the order submission.

Work order estimator 254 may estimate the cost of completing a decomposed work order across work units of a workflow (submitted via a workflow manager), based on resources that are associated with the work units for each resource type. Work order estimator 254 may store the cost in one of databases 210 in terms of resource capacity units (RCUs) and duration of time required to complete tasks or processes that are associated with the work order.

WO decomposer and optimizer 256 may break down an order into work units based on the workflow associated with the order. Furthermore, based on the decomposition, WO decomposer and optimizer 256 may generate work unit tasks, or simply "tasks," assign task parameters, and create task connectors, which are described below. Once the order is decomposed, WO decomposer and optimizer 526 may generate a bill of materials for the work order. The bill of materials may evolve as each of the tasks are executed by work unit processes spawned, initiated, or threaded by work order execution system 270.

WO scheduler 258 may match cost estimates for different resource types for a work order to available time slots in an allocation schedule across different network elements (e.g., hardware/software components that perform underlying operations for a work unit). As a result of the scheduling, WO scheduler 258 may output start and end times for each of the work unit tasks and for resource reservations.

Runtime resource manager 260 may allocate network elements/user groups to a process at the time of execution on behalf of a work unit. Runtime resource manager 260 may attempt to honor scheduled reservations of resources. However, if the resources are unavailable, runtime resource manager 260 may attempt to obtain replacement resources.

Metrics collector 262 may determine, for each work unit, actual time of completion and used/consumed resources associated with the execution of the work unit. Based on previous execution measurements, metrics collector 262 may modify factors that are used to estimate the resource and time necessary to complete a task associated with a work unit, for a particular asset.

DDC work order execution (WOE) system 270 may include one or more devices to manage the flow and execution of work units of a defined workflow associated with a work order. DDC WOE system 270 may include a command processor 272, work unit adapters 274, and network elements 276. For simplicity, FIG. 2 does not show other components of WOE system 270. Depending on the implementation, DDC WOE system 270 may include additional, fewer, or different components than those illustrated in FIG. 2. For example, WOE system 270 may include a work unit processor (not shown).

Command processor 272 may drive work order execution. Command processor 272 may include a WO manager, WO processor, and work unit processor. The WO manager may provide interfaces to resource management system 250 for initiating an execution of a work order, retrieving the status of the work order, suspending/resuming the work order execution, canceling the work order, etc. The WO processor may coordinate work unit tasks for completion of a work order. In coordinating different work unit tasks, the WO processor may sequence the tasks for optimum execution time and resource utilization.

The WO processor may communicate with runtime resource manager 260 for allocation and de-allocation of resources. The work unit processor may dispatch processes/threads to perform a work unit task. These processes/threads, herein refereed to as "work unit process," may write to the bill of materials that has been generated by WO decomposer and optimizer 256. In one implementation, WO decomposer and optimizer 256 may be implemented as an object, and in such cases, the work unit processes may update the bill of materials via an invocation of an update method that is a member function of WO decomposer and optimizer 256 object.

Work unit adapter 274 may include interfaces for adapting network elements to perform media content processing corresponding to a work unit. In one implementation, each work unit adapter 274 may be versioned and may include Java code. Each work unit adapter 274 may monitor the corresponding network element to prevent over-allocation of the network element, maintain normal execution of logic associated with the network element, and provide real-time information to metrics collector 262.

Network elements 276 may include physical or logical network devices/components for processing media content.

DDC support system 290 may include one or more devices and/or personnel to provide support services, such creation of work units, composition of workflows, etc., billing support, contracting management, pricing, etc. In one implementation, the billing support services may receive, when different tasks associated with a work order finish, the bill of materials associated with the work order. Based on the bill of materials, the billing support services may determine invoicing information.

The configuration shown in FIG. 2 is for illustrative purposes. In other configurations and/or implementations, functions that are associated with one component or platform shown in FIG. 2 may be performed by one or more other components in FIG. 2; any of the components may be connected to any other of the components; and functions of one component may be included in another component. Accordingly, in the other configurations or implementations, DDC 150 may include additional, fewer, different, or a different arrangement of components than those illustrated in FIG. 2.

Figure 3:
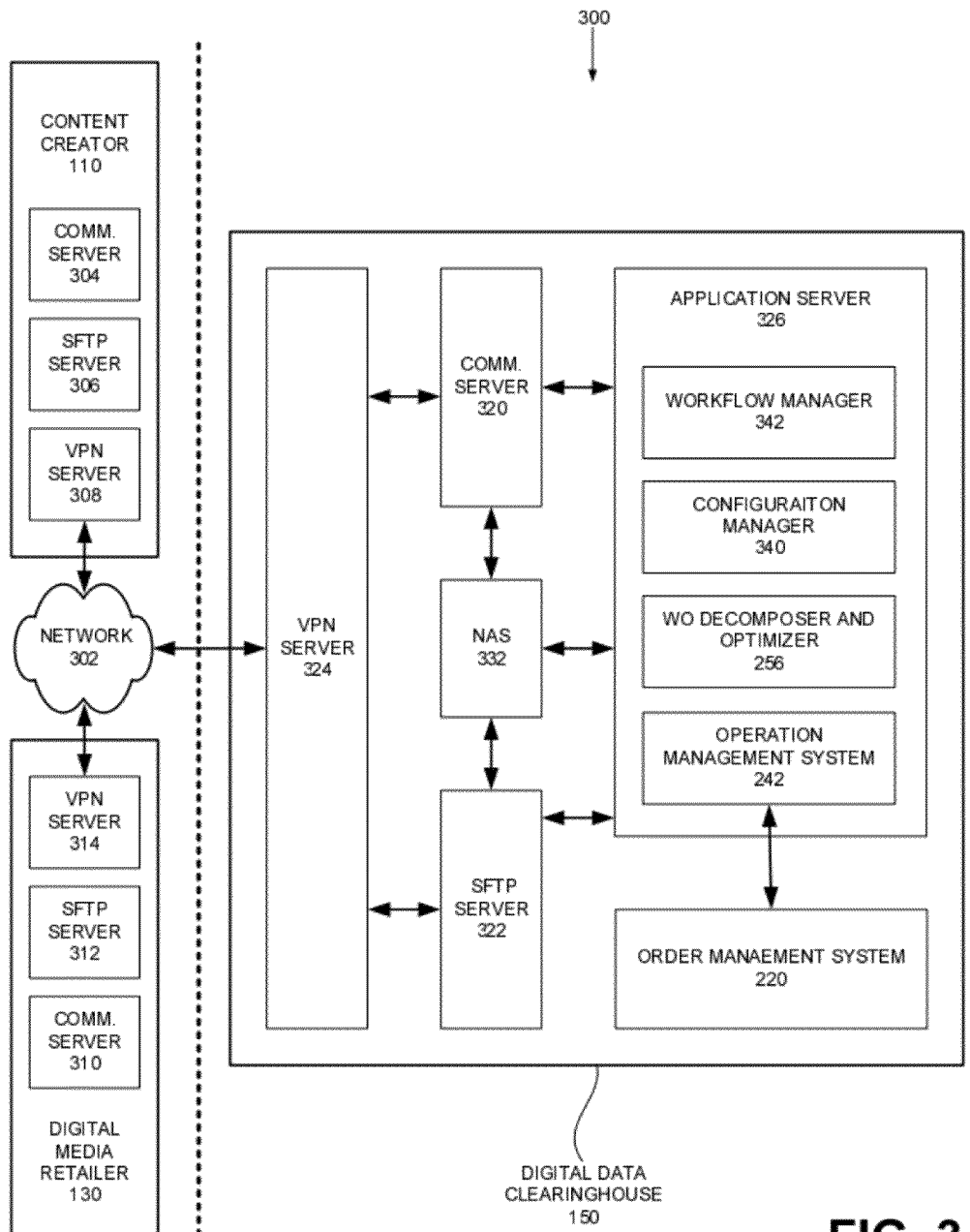
FIG. 3 illustrates an exemplary network in which the DDC of FIG. 1 may be implemented.

FIG. 3 illustrates an exemplary network 300 in which DDC 150 may be implemented. Network 300 may include content creator 110, digital media retailer 130, digital data clearinghouse 150, and network 302. Although network 300 may include additional, fewer, or different network elements than those shown in FIG. 3 (e.g., advertiser 120, consumer 140, bridges, routers, switches, etc.), they are not illustrated in FIG. 3 for simplicity.

As shown, content creator 110 includes different servers for communicating with DDC 150, such as a communication server 304, a secure file transfer protocol (SFTP) server 306, a virtual private network (VPN) server 308. Other components of content creator 110 are not illustrated for simplicity. Communication server 304 and SFTP server 306 may receive or send content to/from DDC 150 via the fast and secure protocol (FASP) and secure file transfer protocol (SFTP), respectively, over a VPN. VPN server 308 may establish a virtual private network between content creator 110 and DDC 150 over network 302.

Also as shown, digital media retailer 130 includes a communication server 310, a SFTP server 312, and a VPN server 314. These components may operate similarly as components 304-308 in content creator 110.

Network 302 may include one or more wired and/or wireless networks that are capable of exchanging information, such as voice, video, documents, multimedia, text, etc., and capable of delivering content from one network element to another network element. For example, network 302 may include one or more public switched telephone networks (PSTNs) or another type of switched network. Network 302 may also include a number of transmission towers for receiving wireless signals and forwarding the signals toward the intended destination. Network 302 may further include one or more packet switched networks, such as an Internet protocol (IP) based network, a local area network (LAN), a wide area network (WAN), a personal area network (PAN), an intranet, the Internet, or another type of network that is capable of exchanging information.

DDC 150 may include a communication server 320, SFTP server 322, VPN server 324, network attached storage (NAS) 332, application server 326, and order management system 220. Communication server 320, SFTP server 322, and VPN server 324 may perform similar functions for DDC 150 as communication server 304, SFTP server 306 and VPN server 308 for content creator 110 (e.g., receive or distribute (e.g., send) content).

Application server 326 may include components for implementing DDC 150 (e.g., DDC service operation management system 240 (not shown), DDC resource management system 250 (not shown), DDC work order execution system 270 (not shown), etc. In FIG. 3, application server 326 is illustrated as including WO decomposer and optimizer 256, operation management system 242, configuration manager 340, and workflow manager 342. In some implementations, application server 326 may support a particular set of standard interfaces (e.g., Java Platform Enterprise Edition™).

In FIG. 3, order management system 220 is illustrated as interacting with operation management system 242. A user at order management system 240 may interact with operation management system 242 via a client application, such as a web browser. For example, the client application may, based on the user input, initiate a chain of method calls (via different components in DDC 150) to request creation of a workflow.

Figure 4:
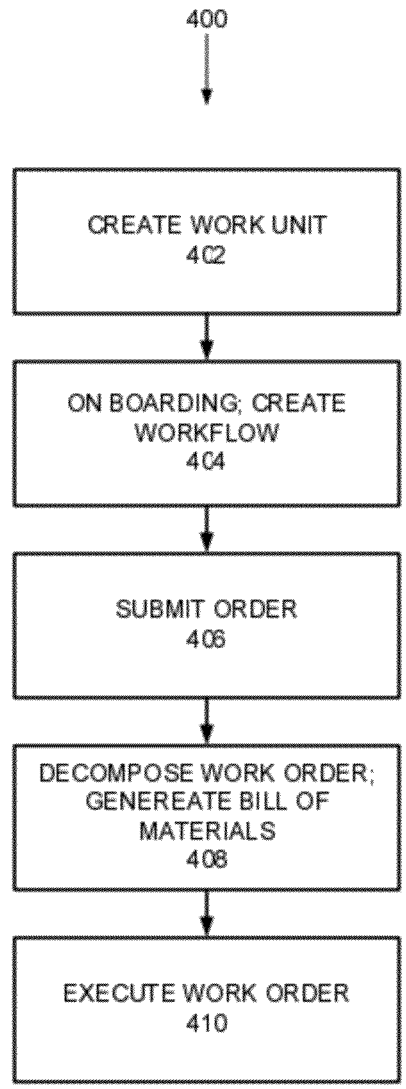
FIG. 4 is a flow diagram of an exemplary process that is associated with processing a bill of materials.

FIG. 4 is a flow diagram of an exemplary process 400 that is associated with the components of FIG. 2 and FIG. 3. Process 400 may include operations or actions (shown in blocks 402-410) that may be performed by DDC 150 for processing content. Process 400 is described herein for illustrative purposes. In a different context, DDC 150 may perform other processes that include additional, fewer, or different operations than those shown in FIG. 4. For FIG. 4, assume that a customer (e.g., a content creator/provider) has an account with DDC 150. Also, assume that a DDC operator (e.g., a user) is administering DDC 150.

DDC 150 may create a work unit (block 402). For example, the DDC operator may construct a work unit via a client graphical user interface (GUI) communicating with a configuration manager (not shown in FIG. 3). In creating the work unit, the DDC operator may specify parameters that characterize the work unit.

Figure 5A:
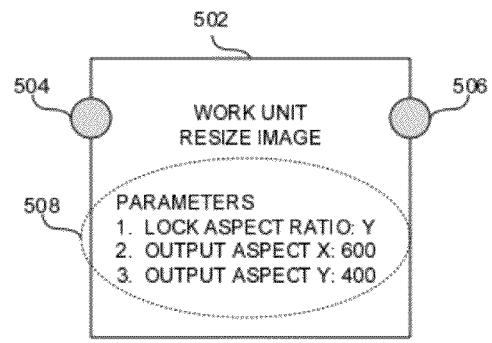
FIG. 5A is a block diagram of an exemplary work unit.

FIG. 5A is a block diagram of an exemplary work unit 502. As shown, work unit 502 may include an input connector point 504 (or an input port 504) and an output connector point 506 (or an output port 506) and parameters 508. DDC 150 may include other work units, each of which may include additional and/or different configurations than those illustrated in FIG. 5A.

Input port 504 may represent the type of input that work unit 502 may receive. For example, work unit 502 may receive a 1024×768 video stream (not shown). Output port 506 may represent the type of output that work unit 502 may generate. For example, work unit 502 may generate 600×400 video, based on a 1024×768 input video. Other types of work units may include different types of input/output ports. For example, a work unit for packaging a video for distribution may include an input port for receiving metadata and another input port for receiving a video. The work unit may also include an output port for generating a packaged video (e.g., a video coupled to metadata).

Parameters 508 may include values that characterize work unit 502. For example, in FIG. 5A, parameters 508 include a flag indicating whether an aspect ratio of an output video is to be the same for all videos processed by work unit 502; a X-resolution of 600; and a Y-resolution of 400. The parameters may be stored in one or more databases 210. In addition, the parameters can be set up as system values that are not changeable, default values that are changeable, default values that require user verification, and parameters that require user entry.

Returning to FIG. 4, once one or more work units have been created, the work units may be used to compose a workflow. For example, when a customer signs up for services with DDC 150, DDC 150 may perform "on-boarding" operations. The on-boarding operations may include creating a new account for a content provider or a DMR 130 via operation management system 242 and the account manager in SOM modules 244. The account creation may entail creating a new account record, configuring the account, setting up parameters, and composing one or more new workflows using the work units (block 404). In composing a new workflow, the user may also use or create one or more presets, which are described below.

For example, assume that the DDC operator has received a specification, from a customer, for transforming a 1024×768 video to a 600×400 video. Based on the specification, the DDC operator may assemble a workflow via a configuration manager and/or a workflow manager included in DDC service operation management system 240. The workflow may include work unit 502.

Figure 5B:
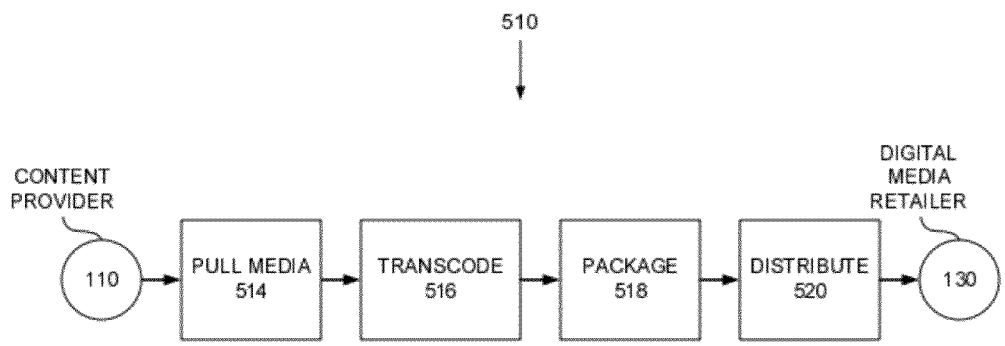
FIG. 5B is an exemplary workflow diagram.

FIG. 5B illustrates an exemplary workflow diagram 510. In one implementation, DDC 150 may display workflow diagrams at a GUI client via a configuration manager. The DDC operator may edit and/or save such workflow, represented by workflow diagrams. As shown in FIG. 5B, workflow diagram 510 includes a content creator/provider 110, pull media work unit 514, transcode work unit 516, package work unit 518, distribute work unit 520, and DMR 130. Other workflow diagrams may include the same, additional, and/or different work units than the ones illustrated in FIG. 5B.

In workflow diagram 510, the input and output ports of work units 514 through 520 connect one work unit to another work unit. For example, the output port of pull media work unit 514 is connected to the input port of transcode work unit 516. Connecting work units 514-520 may form a processing path through which media content may "flow."

To allow the user to manage workflows (e.g., create, update, edit, and/or perform other functions that are associated with workflows), a workflow manager in DDC 150 may include a number of interfaces for invoking method/procedure/programs (e.g., remote or local calls) that are accessible to users. Such interfaces may allow the user to save a workflow, update the workflow, get information about a workflow, etc.

Returning to FIG. 4, once the workflow has been created, tested, and saved, the customer may place a request with DDC 150 to process content. Upon receiving the request, the DDC operator may log onto the customer account and select a workflow corresponding to the requested processing along with a set of parameters that are to be applied to the workflow. In some implementations, the DDC may allow the user to select, rather than a workflow, a "stock keeping unit" (SKU). The SKU, as used herein, may represent a specific combination of work units with or without one or more parameter values that are already set.

Next, the DDC operator may submit an order, which may be associated with the request, with DDC 150, to process the content in accordance with the selected workflow or the SKU (block 406). When operation management system 242 and the work order manager in SOM modules 244 relay the order to DDC resource management system 250, WO decomposer and optimizer 256 may decompose the order (block 408). The decomposition may include converting each element of the workflow associated with the order into a work unit task. Alternatively, if a SKU were submitted, the DDC 150 may use a set of operations that are identified by each SKU to look up and/or obtain corresponding work unit tasks.

For each connection between an input port of one work unit and an output port of another work unit, WO decomposer and optimizer 256 may create a "connector." A connector may include either memory or space in an asset manager (e.g., a component that includes one or more of databases in databases 210) to store temporary data of the type specified by the output port, of a work unit, to which one end of the connection is coupled. In one implementation, the asset manager in DDC 150 may control such data (e.g., input and output files). When a process corresponding to the work unit places its output data in the connector (e.g., the memory or the space in database 210), another work unit whose input port is attached to the other end the connector may process the data on the connector.

In addition to generating one or more connectors, WO decomposer and optimizer 256 may also generate a bill of materials corresponding to the work unit tasks (block 408). As described above, a bill of materials may describe inputs and outputs of each task obtained from the workflow/SKU. In some implementations, the bill of materials may exist as an object in WO decomposer and optimizer 256 or the asset manager. In addition, DDC 150 may store the bill of materials as records in databases 210 for object persistence.

Figure 6:
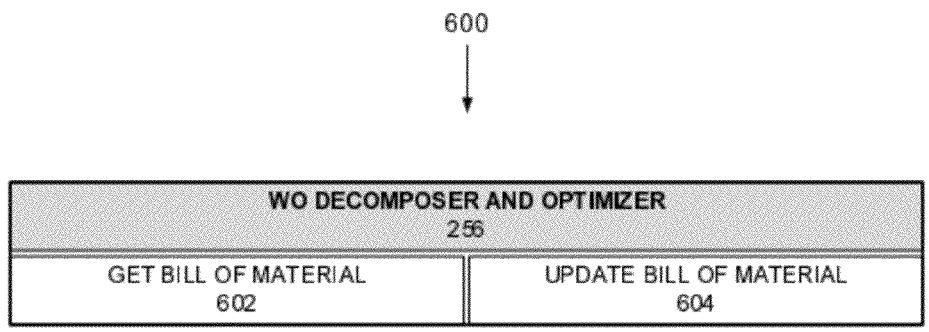
FIG. 6 is a list of exemplary functions that are associated with handling a bill of materials.

FIG. 6 is a list of exemplary functions that are associated with handling a bill of materials generated by WO decomposer and optimizer 256. As shown, the functions may include a get bill of materials 602 and an update bill of materials 604. Get bill of materials 602 may access a copy of the bill of materials. Another component or an object in DDC 150 may invoke get bill of materials 602 to access a specific bill of materials. Update bill of materials 604 may modify or alter a specific bill of materials. In one implementation, a work unit process, after it completes its operation, may access update bill of materials 604 to update a specific bill of materials. In invoking update bill of materials 604, the work unit process (or another process) may provide, as an argument to update bill of materials 604, authentication information (e.g., a user id, customer id, passwords, etc.).

In FIG. 6, it is assumed that the functions are methods of WO decomposer and optimizer 256 implemented as an object. In other implementations, functions for managing a bill of materials may belong a different object or may be static/global functions. Furthermore, depending on the implementation, DDC 150 may include additional, fewer, or different functions than those illustrated in FIG. 6. For example, in one implementation, WO decomposer and optimizer 256 may include a function for sending a specific bill of materials to another object (e.g., an invoicing-related component).

Depending on the embodiment, a bill of materials may include a table (e.g., a hash table), a linked list, etc. However, in the following description, a bill of materials is described as a table. In such an implementation, each record (e.g., a row) of the table may correspond to a specific input/output object (e.g., a file) of a specific work unit task and may describe the state of the input/output object.

Figure 7:
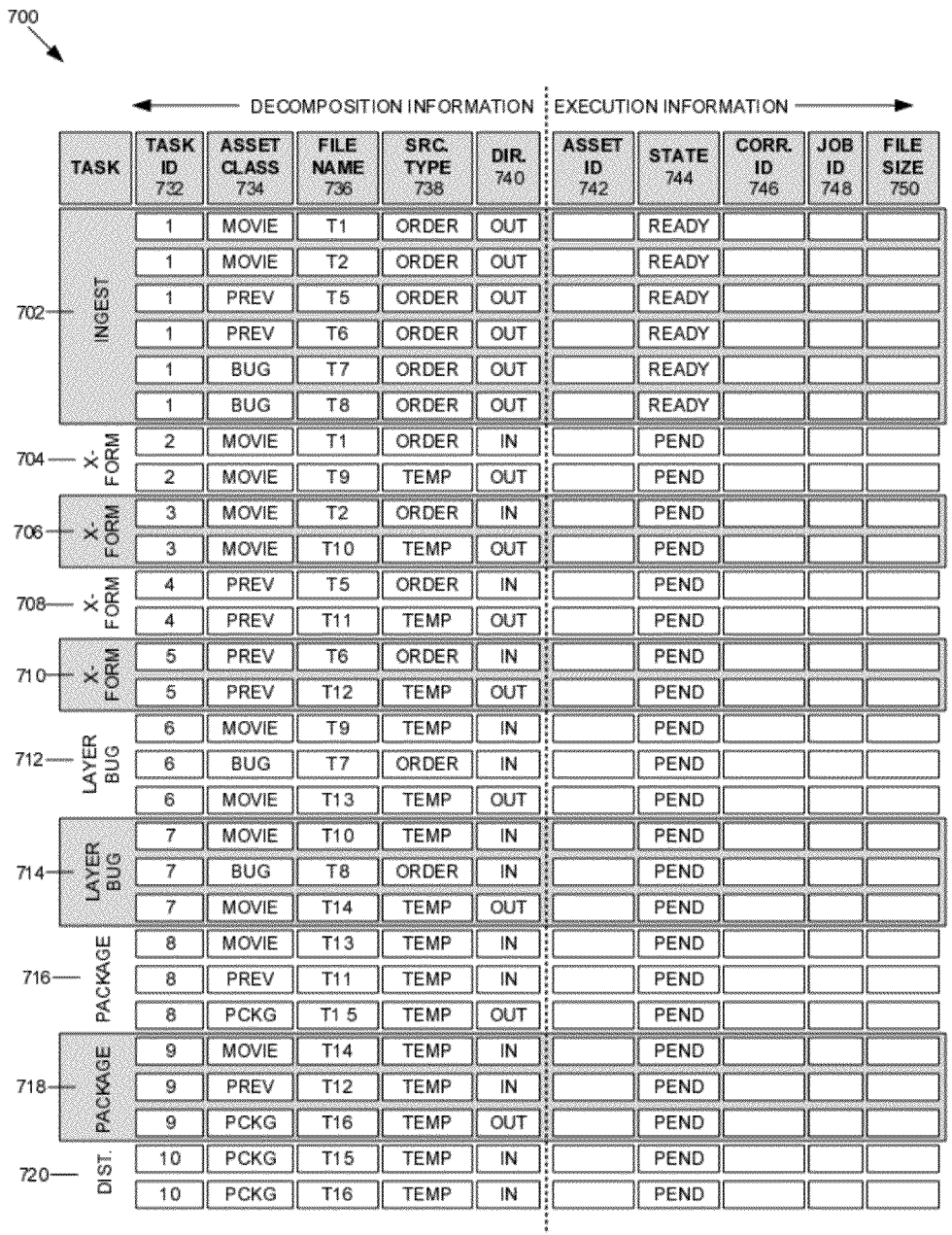
FIG. 7 illustrates an exemplary bill of materials.

FIG. 7 illustrates an exemplary bill of materials 700. In this example, assume that the workflow/SKU specification of the service order requires: (1) processing a movie M1 (MPEG@15 Megabits per second ((MBPS), a bug B1 (e.g., an image to be overlaid on frames of a video), and a preview P1 (MPEG@15 MBPS); and (2) processing a movie M2 (MPEG@ 15 MBPS), a bug B2, and preview P2. In addition, assume that bill of materials 700 shows input/outputs for the following tasks: ingesting the M1, M2, B1, B2, P1, and P2; transforming (e.g., transcoding) M1, M2, P1, and P2; layering B1 and B2 on M1 and M2, respectively; packaging (aggregating) P1 and M1 (after M1 has been bugged); packaging P2 and M2 (after M2 has been bugged); and distributing the packages.

As shown, bill of materials 700 may include work unit task rows 702-720. Task rows 702 may include the states of work unit processes for ingesting M1, M2, B1, B2, P1 and P2 and input/output files associated with the work unit processes. "Ingesting" is further described below with reference to FIG. 11.

Task rows 704 through 710 may include the states of the work unit processes for transforming M1, M2, B1, B2, P1 and P2 and input/output files associated with the work unit processes. "Transforming" may include one transcoding. Transcoding is described below in greater detail with reference to FIG. 11.

Task rows 712 and 714 may include the states of work unit processes for layering B1 on M1 and B2 on M2 and the states of the associated input/output files. Task rows 716 and 718 may include the states of work unit processes for packaging the bugged M1 and P1 and for packaging the bugged M2 and P2 and the states of the associated input/output files. Task row 720 may include the states of a work unit process and for distributing the packages obtained from the packaging processes and the states of the associated output files. "Distributing" is described below with reference to FIG. 11.

As also shown in FIG. 7, each row of bill of materials 700 may include decomposition fields 732 through 740 and work unit process execution fields 742 through 748. Each of decomposition fields 732-740 may include information related to a work unit process and a file (e.g., an input file or an output file) corresponding to one of the tasks resulting from the decomposition of the work order. Each of work unit process execution information fields 742-748 may include information related to execution of the work unit processes.

As further shown, decomposition fields 732-740 may include a task ID field 732, asset class ID field 734, file name field 736, source type field 738, and direction field 740. Task ID field 732 may include an identifier that is allocated for a task for processing an asset. For example, in FIG. 7, each of task rows 702 includes a task ID field 732 with the value 1, which identifies the task. Asset class field 734 may include a type of asset associated with the task. For example, in FIG. 7, the task rows 702 include asset class type fields 734 with values of MOVIE, MOVIE, PREVIEW, PREVIEW, BUG and BUG, respectively, corresponding to M1, M2, B1, B2, P1 and P2.

File name field 736 may include the name of a file associated with each task row. In situations where the files do not yet exist (e.g., because a result of processing does not yet exist), a temporary tag may be shown. For example, in FIG. 7, task rows 702 include file name fields 736 with values T1, T2, T5, T6, T7, and T8, indicating that none of the files exist. More specifically, "T" indicates that the file does not yet exist.

Source type field 738 may indicate the type of location from which asset information is received. For example, the source type field 738 may indicate an asset manager (AM), temporary storage (TEMP), work order (ORDER), etc. In FIG. 7, for example, task rows 702-712 include source type field 738 with the value ORDER.

Direction field 740 may indicate whether the asset associated with the task row is an input file or an output file for the corresponding task. For example, in FIG. 7, each of files T1, T2, T5, T6, T7, and T8 for task rows 702 are shown as OUT, indicating the files are output files for the task with the task ID of 1.

As further shown in FIG. 7, execution fields 742-748 may include asset ID field 742, state field 744, correlation ID field 746, job ID field 748, and file size field 750. Asset ID field 742 may indicate an asset identifier provided by the asset manager. The asset manager may assign an asset identifier for an asset in DDC 150. State field 744 may indicate a current state of a job (a sub-task associated with a particular file for the task row). The allowed values of state field 744 are described below with reference to FIG. 9A. Correlation ID field 746 may include a task identifier provided by an adaptor (e.g., a component that runs a process that underlies the sub-task associated with the task row). Job ID field 748 may include a sub-task identifier that is passed to the adaptor. File size field 750 may indicate the size of the file corresponding to the task row.

Depending on the implementation, each row of bill of materials 700 may include additional, fewer, or different fields than those illustrated in FIG. 7. For example, in one implementation, the rows may include fields for a start time and an end time for each task and/or job.

FIGS. 8A through 8D illustrate updating bill of materials 700 by the work unit processes that are associated with bill of materials 700. Assume that a sub-task (e.g., a job) that is associated with the first row of task rows 702 has been initiated after WO decomposer and optimizer 256 generates bill of materials 700.

As shown in FIG. 8A by an ellipse 802, as soon as task 1 starts, task 1 updates state field 744, correlation ID field 746, and job ID field 748 (e.g., fields that include information on the sub-task for processing the file associated with the first row of task rows 702). As further shown, the value of state field 744 is changed to in "PROGRESS." The values of correlation ID field 746 and job ID field 748 are C2345 and J34, respectively. DDC 150 may assign these values sequentially (e.g., jobs may be assigned a letter and numerical values, where the numerical values are assigned to the jobs in the order the jobs are created).

FIG. 8B illustrates bill of materials 700 after the completion of the sub-task associated with the first row of task rows 702. As shown by ellipse 804, task 1 assigns file name field 736 the value of FILE1 (e.g., via the asset manager) and designates the asset manager (AM) in source type field 738 as the storage for the file. In addition, as shown by ellipse 806, task 1 gives asset ID field 742 the value of 1234 (e.g., obtained from the asset manager) and state field 744 the value COMPLETE (COMP), to indicate that the sub-task for the first row is complete. Ellipse 808 shows that task 1 has updated file size field 750 to include the value of 4 Gigabytes.

Once the values in the first row of task rows 702 are set, WO decomposer and optimizer 256 may update field values in other rows whose sub-tasks are dependent on the completed row (e.g., the first row of task rows 702). As shown by ellipse 810, file name field 736 and source type field 738 of the first row of task rows 704 are changed to FILE1 and AM. Also as shown by ellipse 812, the values of asset ID field 742 and file size field 750 are obtained from the first row of task rows 702, as the values 1234 and 4 Gigabytes, respectively. New values of state field 744, correlation ID field 746, and job ID field 748 are set as READY (e.g., changed from PENDING), C2346, and J35.

Figure 8C:
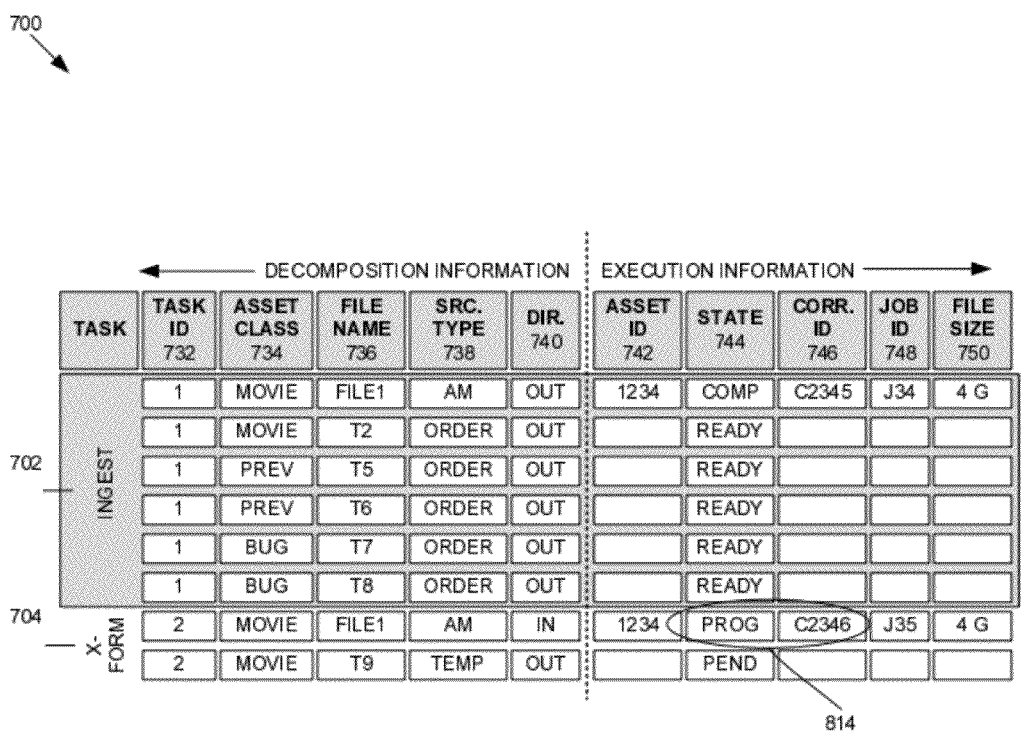

FIG. 8C illustrates bill of materials 700 after the start of the sub-task associated with the first row of task rows 704. As shown by ellipse 814, task 2 updates state field 744 with the value IN PROGRESS (PROG).

FIG. 8D illustrates bill of materials 700 after the completion of the sub-tasks associated with task rows 704. As shown by ellipse 816, a sub-task for processing FILE1 is complete, and state field 744 in task rows 704 is changed to COMPLETE. Also as shown by ellipse 818, the completion of the sub-task results in updating file name field 736 and source type field 738 of the second row of task rows 704 with the values FILE2 and AM, respectively.

Ellipse 820 shows that asset ID field 742, state field 744, correlation ID field 746, job ID field 748, and file size field 750 are updated to 1235 (e.g., the new asset ID assigned by the asset manager to the new file generated from processing FILE1), COMPLETE (e.g., to indicate the sub-task is complete), C2346 (copied from the row immediately above), J35 (e.g., copied from the row immediately above), and 3.5 Gigabytes, respectively.

Once the values in the second row of task rows 704 are set, WO decomposer and optimizer 256 may update field values in other rows whose sub-tasks are dependent on the completed row. As shown by ellipse 822, file name field 736 and source type field 738 of the first row of task rows 712 are changed to FILE2 and AM. Also, as shown by ellipse 824, the values of asset ID field 742 and file size field 750 are obtained from the second row of task rows 704 (e.g., correlation ID field 746, job ID field 748, and file size field 750 of the first row of task rows 712 of layering a bug are dependent on task 704) and have the values 1235 and 3.5 Gigabytes, respectively. New values of state field 744, correlation ID field 746, and job ID field 748 are set as READY (e.g., changed from PENDING), C2347, and J36.

Although not illustrated in FIGS. 8A-8D, WO decomposer and optimizer 256 and work unit processes may update various rows in bill of materials 700 in a manner similar to that described above, until all tasks are complete or partially complete. In some situations, one or more of the tasks may fail to complete. In such a scenario, the failed tasks may be restarted, or an alert may be sent to a user or an operator to initiate a human intervention. Other bills of material may also be similarly processed.

Figure 9A:
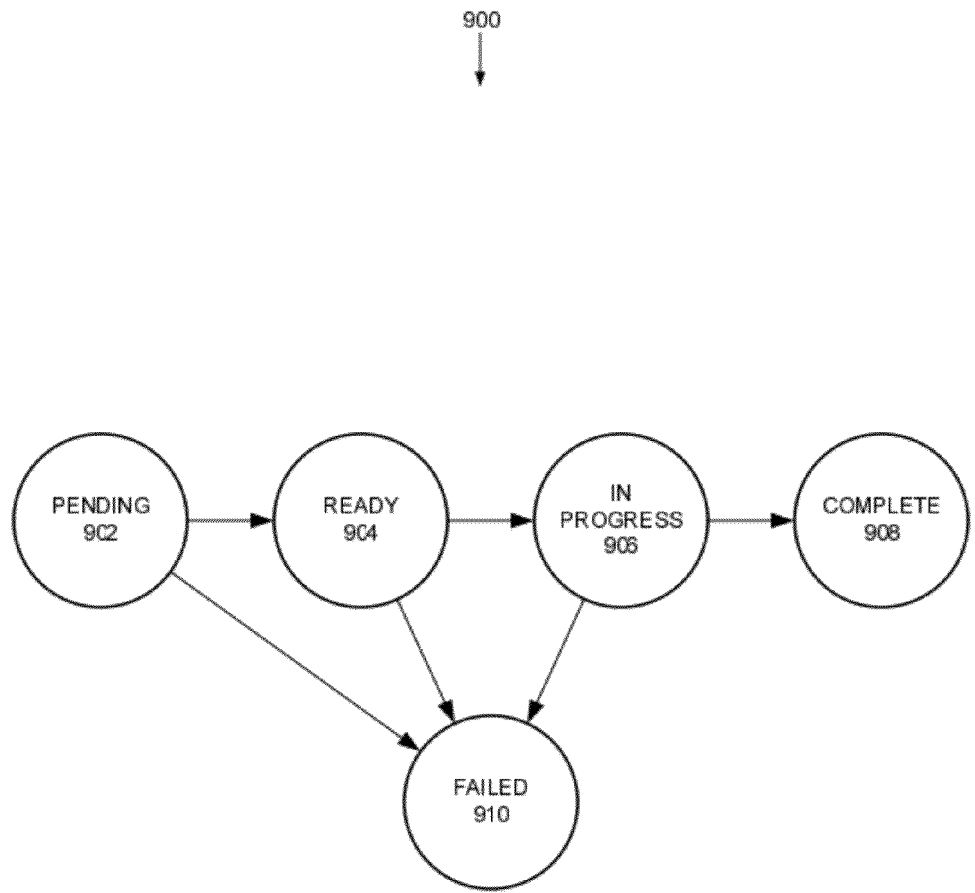
FIG. 9A is an exemplary state transition diagram of a sub-task or an asset in a bill of materials.

FIG. 9A is an exemplary state transition diagram of a sub-task or an asset in a bill of materials. State transition diagram 900 corresponds to one of values that state field 744 can include in FIGS. 7 and 8A-8D. As shown, the state of the sub-task for processing an asset (e.g., file) may start at pending state 902 and proceed to ready state 904 (see FIGS. 7 and 8A). From ready state 904, the sub-task may proceed to in progress state 906 (see ellipse 802 in FIG. 8A and ellipse 814 in FIG. 8C). From in progress state 906, the sub-task may proceed to complete state 908 (see ellipses 816 and 820 in FIG. 8D). It is possible for the sub-task to transition from any of states 902-908 to a failed state 910, rather than proceeding to complete state 908.

FIG. 9B is a list of exemplary components of a bill of materials 920. A number of components of bill of materials 920 are described above, with reference to FIG. 7. As shown, bill of materials 920 may include a bill of materials ID 922, task ID field 924, file name field 926, direction field 928, asset class ID field 930, source type field 932, asset ID field 934, state field 936, correlation ID field 938, job ID field 940, file size field 942, location field 944, created date field 946, and updated date field 948.

Bill of materials ID 922 may include an identifier that is associated with a bill of materials and is created after a workflow/SKU is decomposed/translated into a work unit tasks. Task ID field 924, file name field 926, direction field 928, asset class field 930, source type field 932, asset ID field 934, state field 936, correlation ID field 938, job ID field 940, and file size field 942 are described above with reference to FIG. 7.

Location field 944 may indicate the location of the asset (e.g., a Universal Resource Locator (URL), directory, etc.). Created date field 946 and updated date field 948 may include dates on which a particular sub-task state on bill of materials 920 is created and updated, respectively.

Depending on the implementation, bill of materials 920 may include additional, fewer, or different components. For example, in one implementation, each row of bill of materials 920 may include fields for indicating the start and the end times of a sub-task for processing a file.

Returning back to FIG. 4, to DDC 150, after the submitted work order is decomposed into work unit tasks and bill of material 920 is created, the work unit tasks may be scheduled for execution by components in DDC resource management system 250 and executed by components in DDC work order execution system 270 (block 410). In databases 210, each work unit in the workflow is instantiated as a task to be performed. As described above, as the tasks are being performed, the work unit processes may update bill of materials 900.

Figure 10:
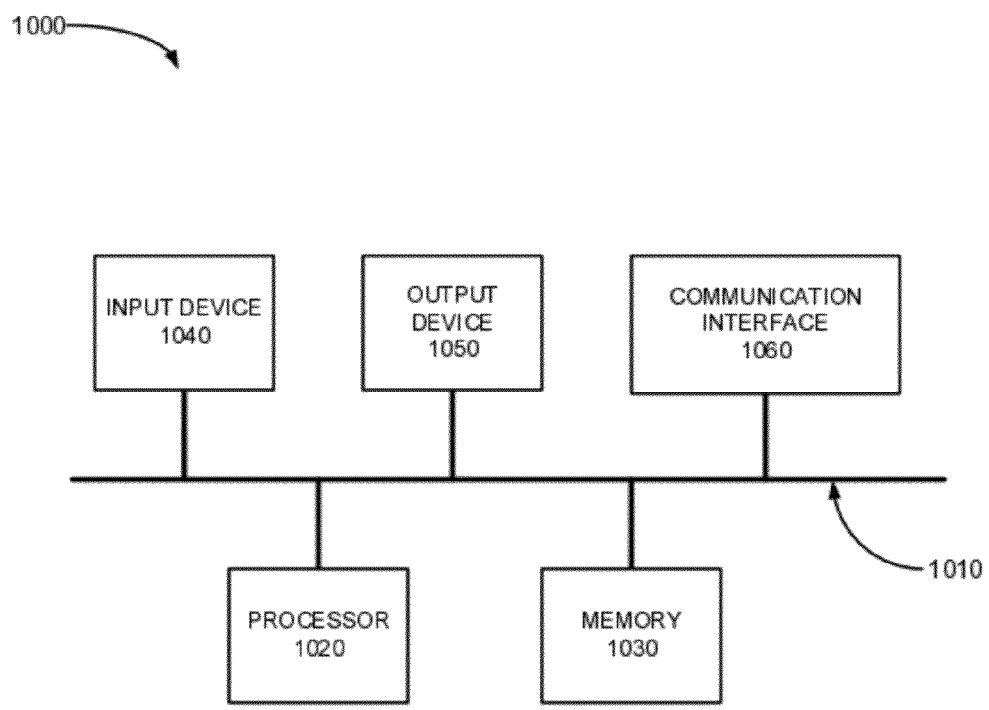
FIG. 10 is a block diagram of an exemplary network device of FIG. 2.

FIG. 10 is a block diagram of an exemplary network device 1000. Network device 1000 may correspond to one or more of devices that may be used to implement, for example, components illustrated in FIG. 2. Referring to FIG. 10, network device 1000 may include bus 1010, processor 1020, memory 1030, input device 1040, output device 1050 and communication interface 1060. Bus 1010 may include a path that permits communication among the elements of network device 1000.

Processor 1020 may include one or more processors, microprocessors, or processing logic that may interpret and execute instructions. Memory 1030 may include a random access memory (RAM) or another type of dynamic storage device that may store information and instructions for execution by processor 1020. Memory 1030 may also include a read only memory (ROM) device or another type of static storage device that may store static information and instructions for use by processor 1020. Memory 1030 may further include a storage device, such as a solid state drive (SDD), a magnetic and/or optical recording medium (e.g., a hard disk), etc. Depending on the context, the term "memory," "storage," "storage device," and/or "storage unit" may be used interchangeably. For example, a "computer-readable storage device" or "computer-readable medium" may refer to both a memory and/or storage device.

Input device 1040 may permit a user to input information to network device 1000, such as a keyboard, a keypad, a mouse, a pen, a microphone, a touch screen, voice recognition and/or biometric mechanisms, etc. Output device 1050 may include a mechanism that outputs information to the user, including a display, a printer, a speaker, etc. In some implementations 1040, because network device 1040 may operate as a server device, network device 1000 may include minimal number of input device 1040 and output device 1050 (e.g., a keyboard and/or a console), to minimize cost and to increase robustness.

Communication interface 1060 may include a transceiver (e.g., a transmitter or receiver) for network device 1000 to communicate with other devices and/or systems. For example, via communication interface 1060, network device 1000 may communicate over a network, such as the Internet, an intranet, a terrestrial wireless network (e.g., a WLAN, WiFi, WiMax, etc.), a satellite-based network, optical network, etc. Communication interface 1060 may also include a modem, an Ethernet interface to a LAN, and/or another interface.

FIG. 11 is a list 1100 of different types of work units. Within DDC 150, the work unit types in list 1100 may be part of a library, from which individual work units may be selected for assembling a workflow. As shown, list 1100 includes a create metadata work unit 1102, transform metadata work unit 1104, pull metadata work unit 1106, pull media work unit 1108, confirm delivery work unit 1110, encode work unit 1112, decode work unit 1114, advertisement marker work unit 1116, close captioning work unit 1118, branch work unit 1120, merge work unit 1122, transcode work unit 1124, split media work unit 1126, distribute work unit 1128, package work unit 1130, encrypt work unit 1132, decrypt work unit 1134, archive work unit 1136, save work unit 1138, retrieve work unit 1140, quality assurance work unit 1142, manual intervention work unit 1144, report work unit 1146, and assembly work unit 1148. Although each of work units 1102-1148 is described below as performing one or more operations, the actual operations are performed via a corresponding work unit process instantiated based on the particular work unit during runtime. Depending on the setting, configuration, version, implementation etc., DDC 150 may provide for additional or different work units than those in list 1100.

Each of work units 1102-1148 may serve one or more business logic/rules associated with content acquisition, transformation and distribution. For example, work units 1102-1108 and 1132-1146 may serve the business logic associated with ingesting asset/content from a content provider; work units 1104, 1112-1126, and 1136-1146 may serve the business logic associated with asset/content transformation; work units 1110, 1128-1134, 1138-1146 may serve the business logic associated with distribution of asset/content, and work unit 1148 may serve the business logic associated with activities prior to ingesting assets.

Create metadata work unit 1102 may receive an asset (e.g., media content) and a length/size of the asset and generate corresponding metadata when the asset does not include metadata. Transform metadata 1104 may receive metadata in one format and convert the metadata in accordance with a different standard or format (e.g., translate between different metadata standards or formats). In some implementations, DDC 150 may also include related work units, such as a work unit for normalizing metadata (e.g., changing metadata format into a standard one). Such a work unit may assign an identifier for each metadata type, as well as a different metadata version number.

Pull metadata work unit 1106 may obtain metadata associated with assets (e.g., download the assets) from a source via, for example, a SFTP client/server application, Aspera Fasp™, Windows™ Common Internet File System (CIFS), hypertext transfer protocol (HTTP), etc. Pull media work unit 1108 may obtain assets from a source. Confirm delivery work unit 1110 may generate and send a message to, for example, a DDC operator, process, customer, etc., upon successfully delivering an asset to an end point (e.g., DMR 130).

Pull work units 1106 and 1108 may pull asset/content/metadata at the earliest start time based on customer order information. During runtime, processes corresponding to pull work units 1106 and 1108 may track what has been pulled as well as the pulling rate required to meet a jeopardy time (e.g., a threshold) for "ingesting" content (i.e., obtaining and storing the asset in DDC 150 according to a set of criteria, such as standardizing metadata received along with the asset). If the pulling rate is below a target rate, work units 1106 and 1108 may generate an alarm.

In some implementations, DDC 150 may also include push work units. To receive contents/assets that are pushed from content creators/providers 110, DDC 150 may provide a staging area with a demilitarized zone (DMZ) architecture. Similar to pull work units 1106 and 1108, the push work units may track what has been pushed as well as the rate of pushing required to meet a jeopardy time, and generate an alarm if the rate is below a target rate. Both the pull and push work units may be capable of receiving live media streams from a source.

Encode work unit 1112 may transform an asset from one format to another format. In transforming the asset, during runtime, encode work unit 1112 may invoke a work unit adapter that performs the actual encoding. Decode work unit 1114 may obtain an original asset from encoded data. In obtaining the original asset, decode work unit 1114 may invoke a work unit adapter that accesses a network element to performs the actual decoding. The decoded data may or may not have been encoded by encode work unit 1112.

Ad marker work unit 1116 may insert advertisement breaks in a media/content. The inserted breaks may include, for example, digital cue tones that are undetectable by viewers, digital program insertion (DPI) markers, etc. Ad marker work unit 1116 may engage engines for generating ad points (e.g., points at which ad breaks may be inserted). Such engines may operate automatically or with user assistance.

Close captioning work unit 1118 may overlay a transcript of audio on an asset. Branch work unit 1120 may send copies of metadata of an asset to multiple work units. Merge work unit 1122 may merge metadata received from multiple work units. Merge work unit 1122 may merge the multiple metadata, for example, when multiple assets are being combined (e.g., concatenated, spliced, etc.).

Transcode work unit 1124 may change the format of an asset (e.g., change frame rate, aspect ratio, resolution, crop, etc.). Transcoding may be efficiently performed when the source and target formats are sufficiently similar. In transcoding, work unit 1124 may use parameters such as, for example: names of source and target files; video frame size; bit rate; frame rate; identity of video codec; audio bit rate; audio sample rate; audio codec; etc. One example of transcoding may include changing a format of an asset originally received in an MP2 format to an Audio Video Interleave (AVI) format.

Split media work unit 1126 may split a media stream/file into multiple streams/files. For example, split media work unit 1126 may split a media file into audio, video, and subtitles and send each to a corresponding decoder. In one implementation, split media work unit 1126 may not itself perform decoding, but stream segregated components of the file/stream to their respective decoders. In other implementations, split media work unit 1126 may split a media stream by segmenting the media stream based on either size or time (e.g., split an hour-long video into two 30 minute videos).

Distribute work unit 1128 may distribute an asset to one or more DMRs and other types of customers. In distributing assets to a particular DMR 130 or consumer 140, distribute work unit 1128 may attach, to the assets, metadata that is specified by content creator 110, DMR 130, or consumer 140. This may require the metadata of the asset to be mapped to the metadata format requested/needed by DMR 130 or consumer 140.

Distribute work unit 1128 may distribute the asset to multiple DMRs concurrently or in sequence, depending on system resource availability and a work order specification. If a network connection with DMR 130 cannot be established, distribute work unit 1128 may re-attempt to distribute to DMR 130 at a later time. Each successive attempt may trigger a wait period that exponentially increases with each trial (e.g., 1 minute, 2 minutes, 4, minutes, 8 minutes, 16 minutes, etc.). When distribute work unit 1128 has tried a particular number of times, distribute work unit 1128 may send an alarm to a DDC operator, indicating that the DMR is off-line. When the DDC operator toggles the state of DMR 130 as being on-line, distribute work unit 1128 may retry all failed distributions. This may or may not result in rescheduling processes (e.g., other distributions) waiting on availability of resources (e.g., bandwidth) allocated for the distribution.

Package work unit 1130 may assemble interrelated assets and data, including content, metadata, artwork, etc., into a single package for distribution. During packaging, package work unit 1130 may require, use, and/or output parameters such as, for example, a name of asset, an asset location (e.g., a network address or a universal resource locator (URL), etc.), a package ID, a package version, a name of metadata, a location of the metadata, etc.

In some instances, for distribution, it is convenient to bundle packages that are generated by package work unit 1130. For such cases, in some implementations, DDC 150 may include a bundling work unit, for combining a list of packages.

Encrypt work unit 1132 may encode data, via an algorithm that renders the recovery of the original data from the encoded data difficult, without using one or more keys. The encryption may secure the original data against unauthorized use. Decrypt work unit 1134 may decode encrypted data, via one or more keys, to recover the original data from which the encrypted data has been obtained. Both encrypt and decrypt work units 1132 and 1134 may allow a user to select a particular encryption/decryption profile (e.g., algorithm or parameter) from available alternatives. In some implementations, the encryption/decryption scheme may generate a root key for a chain of licenses.

Archive work unit 1136 may store data in a long-term repository. In archiving, work unit 1136 may require and/or use parameters such as, for example, an identifier associated with data being archived (e.g., name of an asset, metadata type, etc.), user ID of a user requesting the archive operation, password, etc. Save work unit 1138 may temporarily store an asset during its processing. The stored asset may be removed when the processing is complete or may be made permanent. Save work unit 1138 may require and/or use parameters such as, for example, a name of the asset/metadata being processed, a network address of the asset/metadata, a user ID, a password, etc. Retrieve work unit 1140 may retrieve stored data/asset from a particular location in a network, based on the name and location of data/asset, etc.

Quality assurance work unit 1142 may check the quality of processed data/asset, to ensure that the processed data/asset meets source (e.g., content creator 110) and target (e.g., DMR 130) requirements. For example, quality assurance work unit 1142 may determine whether processed data/asset has been transcoded correctly and is free of corruption. In another example, quality assurance work unit 1142 may check the quality of assets/content received from a source (e.g., file size, checksum, etc.). In some implementations, in addition to quality assurance work unit 1142, DDC 150 may also provide a metadata quality assurance work unit that checks for presence of particular fields, allowed values in the fields, titles, asset ID, etc.

Manual intervention work unit 1144 may assign (based on input from a manager or another user) work to human workers. In assigning the work, manual intervention work unit 1144 may send messages to the workers. Report work unit 1146 may send different types of reports to users (e.g., emails, notifications, etc.).

Assembly work unit 1148 may assemble data for generating a work order. The data may include customer-provided profiles for downloading an asset, a workflow, generic work order instructions, bill of materials (e.g., a specification setting forth a set of inputs and outputs necessary to execute a work order), etc.

Depending on the implementation, DDC 150 may provide other types of work units not in list 1100. For example, DDC 150 may include a work unit for transcoding ingested assets into a low-resolution proxy asset. For this operation, the required parameters may include, for example, a video frame size, bit rate (e.g., 1024 k), frame rate, video codec, etc. In another example, DDC 150 may include image/art work transformer work unit for changing a resolution, black filling, etc., and/or rendering other types of modifications to the image/artwork.

Additional examples of the other types of work units include work units for publication of content, allowing manual handling of metadata and/or content, adapting ad markers, transforming artwork and images, inserting logos, ads or black space into content, allowing manual assembly, allowing manual packaging, checking time code, bundling packages, audio leveling, layering content, and concatenating content.

In the foregoing description, DDC 150 may allow a user to define or create work units and use the work units to compose a workflow and, to dynamically provide for customer-requested processes for content distribution. When the user submits a service order for processing content on behalf of a customer, DDC 150 may obtain, from the workflow associated with the service order, tasks that correspond to the work units. Furthermore, DDC 150 may perform all or some of these tasks.

In obtaining and performing these tasks, DDC 150 may also generate a bill of materials, such as bill of materials 700 or 920. Once generated, the bill of materials may describe inputs and outputs of each task obtained from the workflow. DDC 150 continually updates the bill of materials as DDC 150 executes the tasks, until their termination. DDC 150 may use the bill of materials to reschedule tasks, verify the completion of the tasks, take appropriate actions when one or more of the tasks fail, send the bill of materials to a billing department for invoicing the customer for processing the content in accordance with the workflow, etc.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with regard to an exemplary process illustrated in FIG. 4, the order of the blocks may be modified in other implementations. In addition, non-dependent blocks may represent acts that can be performed in parallel to other blocks. Furthermore, process 400 may include additional, fewer, or different blocks than those illustrated in FIG. 4.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A method performed by one or more network devices, comprising:
    receiving an input specification;
    composing a workflow by connecting an output port of a first one of a plurality of work units to an input port of a second one of the work units, wherein the workflow includes the work units;
    receiving a work order associated with the workflow;
    decomposing the workflow into the work units upon receipt of the work order;
    instantiating tasks that correspond to the work units and are to be performed by one or more of the network devices;
    generating a bill of materials that lists input and output files associated with the tasks based on the tasks and the input specification; and
    updating fields of the bill of materials, the fields indicating states of the input and output files.

2. The method of claim 1, wherein the updating includes:
    modifying, in the bill of materials, values of fields that depend on values of another field that is updated when a file that is associated with the other field is completely processed.

3. The method of claim 1, wherein the updating fields of the bill of materials includes:
    updating a job identifier field; or
    a file size field.

4. The method of claim 1, further comprising:
    processing one or more of the input files to generate one or more of the output files.

5. The method of claim 4, wherein the processing includes one of:
    ingesting files;
    transcoding files; or
    distributing files.

6. The method of claim 4, further comprising:
    restarting or retrying one or more of the tasks when one of the tasks fails to complete.

7. The method of claim 1, wherein the updating the bill of materials includes changing an execution state of one of the work units to one of:

a pending state, a ready state, an in-progress state, a complete state, or a failed state.

8. A system that comprises one or more network devices, the one or more network devices comprising:
a configuration manager configured to:
receive a user specification of input files; and
receive a user selection of a stock keeping unit; and
work order components to:
receive a work order associated with the stock keeping unit;
expand the stock keeping unit into one or more tasks;
generate a bill of materials that lists input and output files associated with the tasks based on the specification and the tasks; and
update fields of the bill of materials, the fields indicating states of the input and output files of each of the tasks.

9. The system of claim 8, wherein each of the tasks includes:
one or more jobs, each job processing one or more of the input files to generate one or more of the output files.

10. The system of claim 9, wherein when the work order components update the fields of the bill of materials, the work order components are further configured to:
receive, from one of the jobs, a request to update a field in the bill of materials.

11. The system of claim 9, wherein when the work order components update the fields of the bill of materials, the work order components are further configured to indicate in one of the fields:
a name given to a file that is output from one of the jobs when the file is created.

12. The system of claim 8, wherein when the work order components update the fields of the bill of materials, the work order components are further configured to:
update a field, in the bill of materials, whose state depend on another field that is updated when a file that is associated with the other field is completely processed.

13. The system of claim 8, wherein the bill of materials includes, for each record in the bill of materials, at least one of:
a field for a file name; or
a field for indicating either a file is an input file or an output file.

14. The system of claim 8, wherein the bill of materials includes, for each record in the bill of materials, at least one of:
a field for identifying an asset; or
a field for indicating a state of a job associated with the asset.

15. The system of claim 14, wherein the state of the job associated with the asset includes one of:
a pending state, a ready state, an in-progress state, or a failed state.

16. The system of claim 8, wherein one of the tasks includes:
a task for ingesting an asset, a task for transcoding video, a task for packaging an output, or a task for distributing a file.

17. The system of claim 8, wherein the bill of materials includes:
records in a database; and
an object instance.

18. The system of claim 8, wherein the bill of materials includes, for each record in the bill of materials, at least one of:
a field indicating a time of creating a file; or
a field indicating a time of updating a file.

19. The system of claim 8, wherein the work order components are further configured to:
send the bill of materials to a component for invoicing customers.

20. One or more non-transitory computer-readable storage devices, comprising computer-executable instructions for execution by at least one processor, the instructions causing the at least one processor to:
create a workflow by connecting an output port of a first one of a plurality of work units to an input port of a second one of the work units;
receive a work order associated with the workflow;
decompose the workflow into the work units upon receipt of the work order;
initiate tasks that correspond to the work units;
populate a table that lists input and output files associated with each of the tasks;
update fields of the table, the fields indicating states of the tasks and each of input and output files; and
store the table.

* * * * *